United States Patent [19]

Nakaji et al.

[11] Patent Number: 4,940,337

[45] Date of Patent: Jul. 10, 1990

[54] APPARATUS FOR SEPARATING HEAVY METALS FROM A FERRIC CHLORIDE WASTE FLUID

[75] Inventors: Nobuo Nakaji; Hideki Kojima, both of Tokyo; Ryoichi Tachibana, Akou, all of Japan

[73] Assignees: Toppan Printing Co., Ltd.; Mitsubishi Rayon Engineering Co., Ltd.; Harima Chemial Industrial Co., Ltd., all of Japan

[21] Appl. No.: 403,796

[22] Filed: Sep. 5, 1989

Related U.S. Application Data

[63] Continuation of Ser. No. 64,194, Jun. 18, 1987, abandoned.

[30] Foreign Application Priority Data

Jun. 23, 1986 [JP] Japan ................................ 61-146471

[51] Int. Cl.[5] ......................... B01F 15/06; B01F 9/02; B01J 8/10

[52] U.S. Cl. .................................... 366/148; 366/187; 366/228; 210/912; 422/209

[58] Field of Search ............... 366/219, 220, 223, 228, 366/239, 184, 185, 187, 188, 131, 134, 135, 144, 148, 192, 54, 60, 62, 63, 225; 210/912, 402, 784; 222/481, 481.5; 422/198, 209

[56] References Cited

U.S. PATENT DOCUMENTS

| | | | |
|---|---|---|---|
| 110,482 | 12/1870 | Marshall | 366/228 |
| 114,126 | 4/1871 | Gaston | 366/225 |
| 124,112 | 2/1872 | Bradley | 366/225 |
| 138,319 | 4/1873 | Dextor | 366/228 |
| 690,240 | 12/1901 | Cutler | 366/220 |
| 696,222 | 3/1902 | Arledter | 366/220 |
| 956,065 | 4/1910 | Fleming | 366/192 |
| 1,432,028 | 10/1922 | Listen | 366/228 |
| 1,549,943 | 8/1925 | Whiting | 366/220 |
| 1,831,091 | 10/1931 | Bowers | 366/228 |
| 1,867,541 | 7/1932 | Shellabarger | 366/228 |
| 1,928,950 | 10/1933 | O'Neill | 366/185 |
| 2,089,535 | 8/1937 | Cave | 366/188 |
| 2,144,251 | 1/1939 | Bartholomew | 366/148 |
| 2,419,814 | 4/1947 | Boileau | 366/228 |
| 2,453,583 | 11/1948 | Muller | 366/60 |
| 2,477,009 | 7/1949 | Sandler | 366/220 |
| 2,610,123 | 9/1957 | Bruyere et al. | 366/192 |
| 2,750,080 | 6/1956 | Blanchard et al. | 222/481.5 |
| 2,900,176 | 8/1959 | Krogel | 366/192 |
| 2,979,096 | 4/1961 | Karge et al. | 366/225 |
| 3,095,185 | 6/1963 | Smalley | 366/228 |
| 3,609,921 | 10/1971 | Foster et al. | 366/219 |
| 3,863,902 | 2/1975 | O'Brien et al. | 366/228 |
| 4,136,965 | 1/1979 | Sunnergren et al. | 366/228 |
| 4,173,419 | 11/1979 | Blok | 366/228 |
| 4,243,075 | 1/1981 | McPherson et al. | 138/174 |
| 4,423,961 | 1/1984 | Steiner | 366/228 |
| 4,509,860 | 4/1985 | Lasar, III | 366/184 |
| 4,533,054 | 8/1985 | Sommer, Jr. et al. | 366/228 |

FOREIGN PATENT DOCUMENTS

| | | | |
|---|---|---|---|
| 439266 | 9/1948 | Italy | 366/220 |
| 59-121123 | 11/1984 | Japan . | |
| 1027206 | 4/1966 | United Kingdom | 366/60 |

*Primary Examiner*—Harvey C. Hornsby
*Assistant Examiner*—Joseph S. Machuga
*Attorney, Agent, or Firm*—Lerner, David, Littenberg, Krumholz & Mentlik

[57] ABSTRACT

The present invention provides a stirring apparatus for mixing, with metallic iron masses, a concentrated strongly acidic ferric chloride waste fluid containing iron and one or more other heavy metals in which the content of nickel is highest, the stirring apparatus being characterized by comprising a rotating mechanism for rotating a container, and a passage which is disposed in a rotary shaft and through which excess gas and liquid generated during stirring is discharged into the outside.

14 Claims, 4 Drawing Sheets

FIG.2
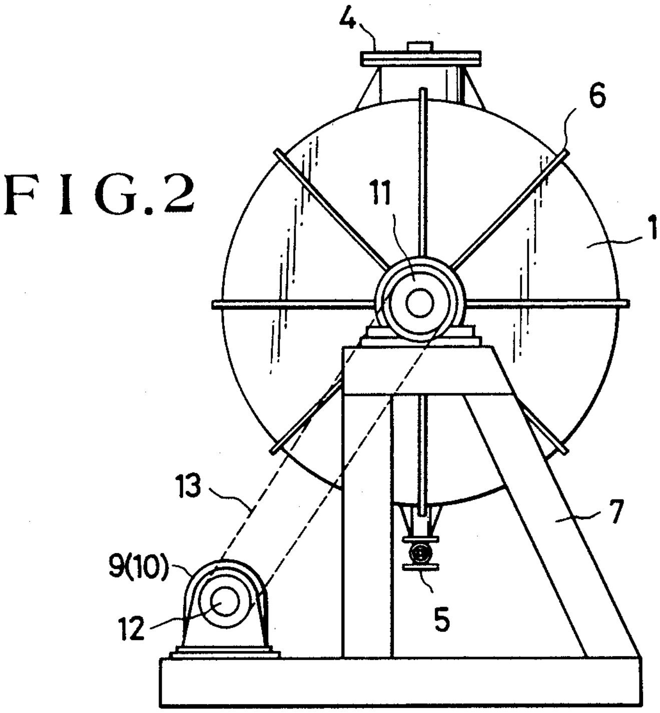
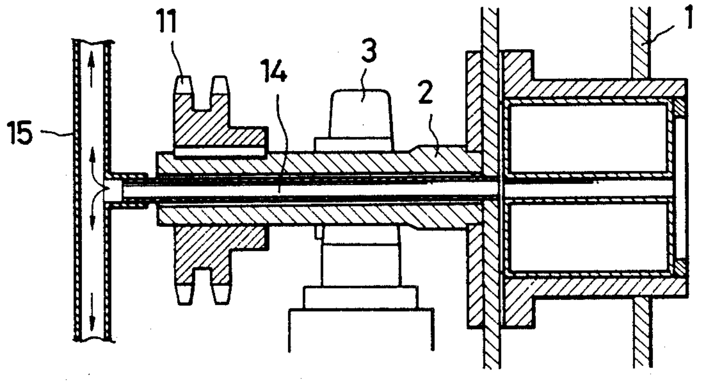
FIG.3

APPARATUS FOR SEPARATING HEAVY METALS FROM A FERRIC CHLORIDE WASTE FLUID

This is a continuation of application Ser. No. 07/064,194 filed June 18, 1987 now abandoned.

BACKGROUND OF THE INVENTION

1. Field of the Invention

The present invention relates to a stirring apparatus for stirring a ferric chloride etching waste fluid containing heavy metals and masses of metallic iron in order to mix them with each other and to thereby precipitate the heavy metals in the waste fluid with a high efficiency.

2. Description of the Prior Art

A ferric chloride solution has been extensively used as an etching solution for etching metallic plates comprising steel, copper, stainless steel, nickel alloy or the like. When this kind of etching solution is repeatedly used, heavy metals (nickel, chromium, copper, manganese, iron and the like) dissolved therein are accumulated and concentrated therein and trivalent iron ions are finally reduced to divalent iron ions, so that ferric chloride in the solution is changed into ferrous chloride, with the result that the etching power of the solution declines and the solution eventually turns to a waste fluid.

Heretofore, as a treating process for the waste fluid, there is taken a means for adding a solution of an alkali such as lime [$Ca(OH)_2$] to the waste fluid in order to neutralize the latter and to thereby precipitate the heavy metals in the form of hydroxides. In this process, however, all of the heavy metals, including iron, are precipitated, and it is therefore difficult to separate iron from the other heavy metals and when one attempts to then dispose of the thus formed precipitate of the heavy metals, or sludge, many problems of "enviornmental pollution", are created. In particular, the recovery of ferric chloride is not possible in connection with this process and this fact is not economical.

As a consequence, there is considerable demand for a novel technique which permits one to recover the ferric chloride solution and recycle same a number of times.

Heretofore, in order to recover the ferric chloride etching waste fluid, a method has been used which comprises adding masses of metallic iron to the ferric chloride etching waste fluid, precipitating the heavy metals, exclusive of iron, by utilizing the difference in a difference of ionization potential between iron and the other heavy metals, filtering out the precipitated heavy metals, and blowing a chlorine gas thereinto so as to change divalent iron ions into trivalent iron ions. Where a great deal of nickel is present in the waste fluid, however, this method entails the following problem: Since it has a strong affinity for iron, nickel is liable to precipitate together with the iron, with the nickel then adhering to iron surfaces. This adhered nickel then renders the iron passive, so as to undesirably halt the exchange precipitation reaction between iron and the other heavy metals having a low tendency toward ionization.

One measure which can be used to combat this problem is to vigorously stir a mixture of the waste fluid and the iron masses, whereby the iron masses are caused to collide with each other and nickel is thus peeled off from the iron surfaces so as to expose fresh iron surfaces. However, even where this stirring operation is carried out with the specific intention of obtaining such an effect, conventional stirring methods can scarcely provide the desired effect on occasion. Thus, there has been a demand for novel stirring means which are capable of assuring such an effect.

Furthermore, in order to accelerate the precipitation reaction of the heavy metals, it is necessary to maintain the mixture of the waste fluid and the metallic iron masses at an elevated temperature. However, the use of conventional heating system can at times give rise to local or transient overheating which can lead to an explosive reaction, or the leakage of liquid or a gas as a result of a rapid pressure increase in the reaction container, due to problems with the material quality, such as a crack in the reaction container owing to temperature rises in the waste fluid. There is thus also a demand for elimination of these drawbacks.

SUMMARY OF THE INVENTION

In accordance with the present invention the abovementioned drawbacks of the conventional techniques have been overcome and a stirring apparatus has been provided for effectively precipitating heavy metals from a ferric chloride waste fluid containing a great deal of the heavy metals in which the content of nickel is highest, without in any way damaging the apparatus.

Therefore, in accordance with the present invention apparatus is provided for separating heavy metals from a ferric chloride waste fluid containing those heavy metals, including iron and a substantial portion of nickel, in which the apparatus includes a sealable container having a predetermined axis of rotation, and rotating means for rotating the sealable container about that predetermined axis of rotation, the sealable container containing a sealable entrance port for this ferric chloride waste fluid and one or more exit ports for withdrawing the separated heavy metals and treated ferric chloride waste fluid therefrom. In a preferred embodiment, the apparatus also includes excess fluid passage means for discharging excess fluid generated within the container during rotating of the container, and most preferably the rotating means includes a rotary shaft means corresponding with the predetermined axis of rotation of the sealable container, with the sealable container being rotatable about the rotary shaft means. In accordance with a preferred embodiment the excess fluid passage means comprises conduit means within the rotary shaft means, and most preferably it further includes liquid-gas separation means for separating liquid from gas in the fluid passage through the conduit means.

That is, the present invention is directed to a stirring apparatus for mixing, with metallic iron masses, a concentrated strongly acidic ferric chloride waste fluid containing iron and one or more other heavy metals in which the content of nickel is highest, the stirring apparatus being characterized by comprising a rotating mechanism for rotating a container, and a passage which is disposed in a rotary shaft and through which excess gases and liquid generated during stirring is discharged there from.

According to the stirring apparatus of the present invention, the container in which a mixture of the metallic iron masses and the waste fluid is placed is itself rotated, and therefore a stirring operation can be accomplished effectively, whereby a reaction can be completed in a short period of time. In addition, the apparatus itself is designed to have a compact structure and therefore it only occupies a small space, and gas and bubbles generated during the reaction can be discharged to the outside without any difficulty.

BRIEF DESCRIPTION OF THE DRAWINGS

FIG. 2 is a side view showing the same embodiment of the stirring apparatus of the present invention;

FIG. 3 is a sectional view showing a rotary shaft and its vicinity in an embodiment of the stirring apparatus according to the present invention;

DESCRIPTION OF THE PREFERRED EMBODIMENT

Now, the present invention will be described in detail by way of embodiments as follows.

Figure 1:
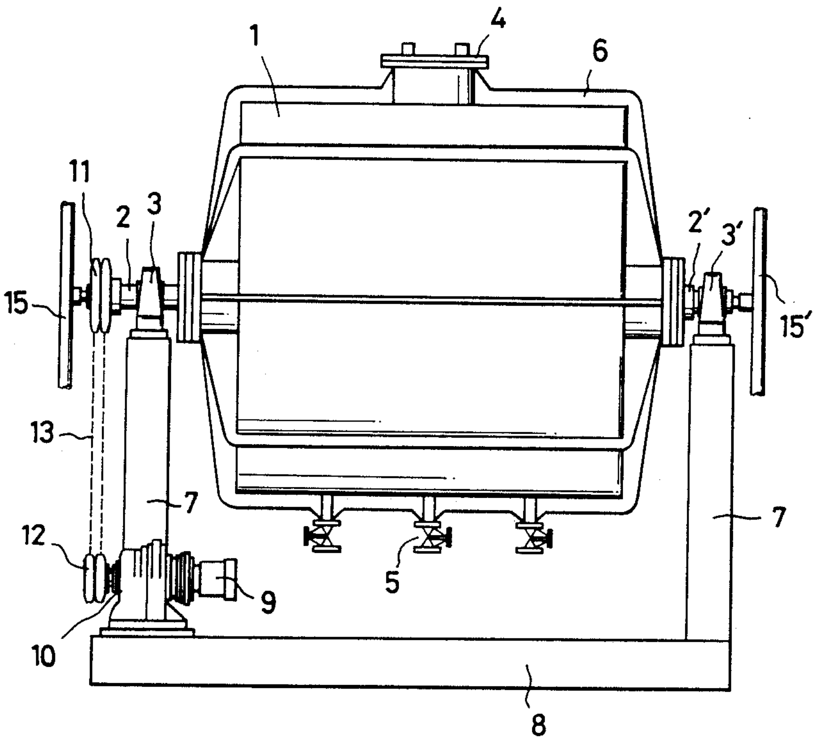
FIG. 1 is a front view showing an embodiment of a stirring apparatus of the present invention.

In FIGS. 1 and 2, a cylindrical container 1 is provided with rotary shafts 2, 2' on the right and left sides thereof, and the rotary shafts 2, 2' are supported by means of bearings 3, 3' so that the container 1 may be rotated. Further, in FIG. 1, a lid 4 and a plurality of drainage valves 5 are provided on and under the container 1, respectively. The above-mentioned lid 4 can be removed, when a waste fluid and metallic iron masses are poured into the container, and the drainage valves 5 are adapted to draw out the treated waste fluid from the container. For the purpose of strengthening the structure of the container 1, in the shown embodiment, eight ribs 6 are mounted on the outer periphery of the container 1. Pole braces 7 for supporting the bearings 3, 3' are uprightly provided on a base plate 8, and a driving mechanism composed of an electronic motor 9 and a cycloreduction gear 10 for reducing rotational frequency is also disposed on the base plate 8. A rotating mechanism for rotating the container 1 is composed of a sprocket wheel 11 disposed in the vicinity of an end portion of the rotary shaft 2, another sprocket wheel 12 on the side of the driving mechanism and a chain belt 13 connecting the sprocket wheels 11 and 12 to each other.

When the ferric chloride waste fluid and the metallic iron masses are stirred at an elevated temperature, hydrogen gas, bubbles and a mist are generated. These gases and the liquid (hereinafter referred to as the fluid) are discharged to the outside through discharge passages 14 provided in the rotary shafts 2, 2' of the container 1. In the shown embodiment, branch pipes 15, 15' for dividing the fluid into upward and downward directions are disposed at the ends of the discharge passages 14, and by the branch pipes 15, 15', a gas such as the hydrogen gas is caused to flow in the upward direction and a liquid including the bubbles and any powder present in the liquid are caused to flow in the downward direction. The gas carried in the upward direction is rendered harmless and is then discharged from the system, and the materials carried in the downward direction are returned to a waste fluid tank, and can be utilized in the next stirring operation, though means of such treatments are not shown. FIG. 3 exhibits an enlarged sectional view of the discharge passage 14.

Although this description is made out of sequence, the above-mentioned driving mechanism composed of the electric motor 9 and the cycloreduction gear 10 is preferably provided with a stopper so that the container 1 may be stopped thereby at a desired rotational angle. The disposition of the stopper is convenient to pour the waste water and the metallic iron masses into the container 1 through the lid 4, and another purpose of the stopper disposition is that when the solution 16, in which an exchange precipitation reaction between the heavy metals and iron has been completed, is removed from the container 1, the precipitated heavy metals 17 are utilized as a filter medium, so that a purified waste fluid 18 can be conveniently discharged through a solution-drawing valve plug 5.

Figure 6:
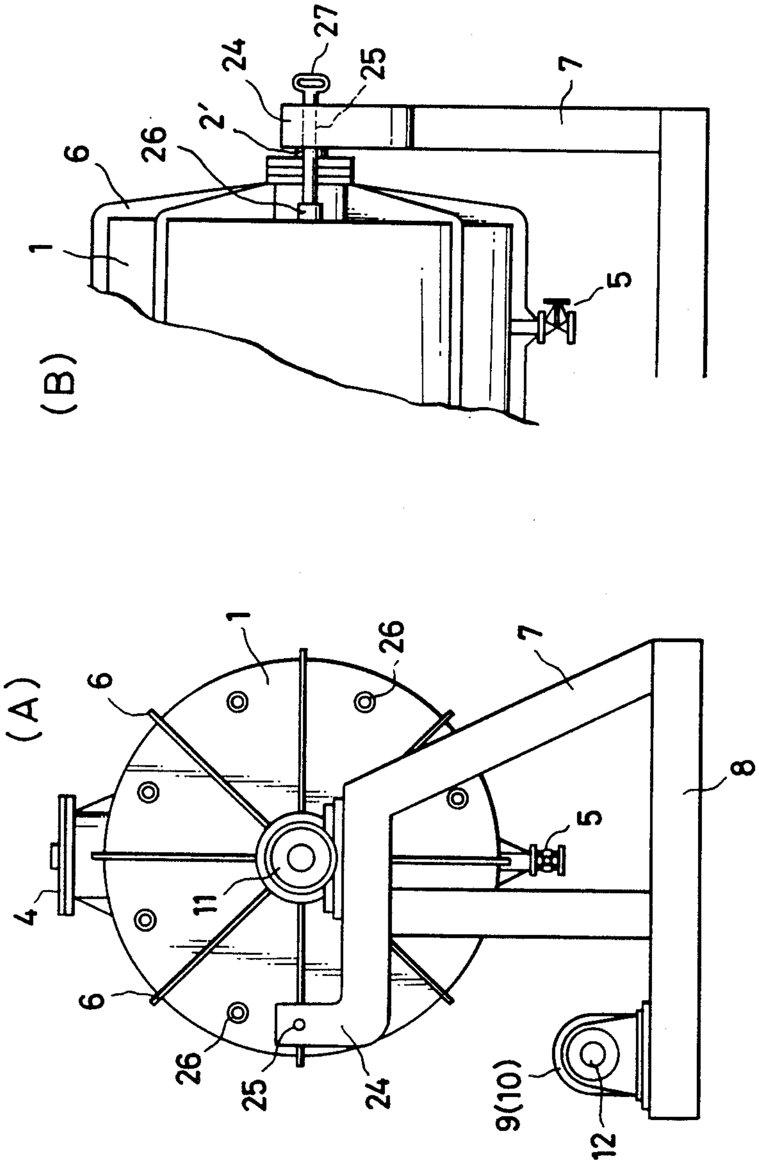
FIGS. 6A and 6B are explanatory view showing an embodiment of a stopper.

An example of the stopper mechanism now follows. As shown in FIG. 6A, a plurality of engagement holes 26 for the stopper are provided on the side of the container 1 at suitable angular intervals. On the other hand, an enlongated brace 24 is secured onto each pole brace 7, and an insertion hole 25 is formed through the upper portion of the enlongated brace 24. The above-mentioned insertion hole 25 and engagement hole are interconnected so that they may lie on a straight line, when the container 1 is at a certain rotational angle. Therefore, when it is intended to stop the container 1 at a desired angle, a fixing rod 27 is inserted into the insertion hole 25 and the engagement hole 26, so that the container 1 is stopped at the desired angle, as shown in FIG. 6B.

Figure 4:
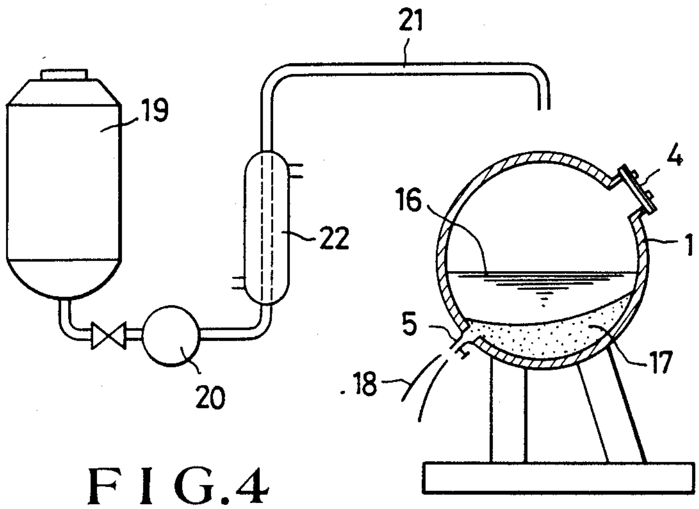
FIG. 4 shows a combination of the stirring apparatus of the present invention and peripheral devices connected thereto.

Further, as shown in FIG. 4, a preliminary heater 22 is preferably disposed on a feed pipe 21. This preliminary heater 22 has a function of heating the ferric chloride waste fluid, prior to its introduction into the container 1, during delivering the waste fluid from a waste fluid tank 19 to the container 1 via pump 20. The reason why such a construction is preferable is that in heating the waste fluid on the way to the container 1, less local and transient overheating occurs than in heating same in the container 1. The temperature of the heated waste fluid is preferably within the range of 60° to 120° C., more preferably 90° to 100° C. When the temperature of the waste fluid is less than 60° C., the reaction is too slow, and when it is more than 120° C., control of the reaction is difficult. In the method where the waste fluid in the container is heated, it is unavoidable that the temperature of a heat source will be higher than a desired temperature level, which fact leads to the danger that the reaction can become explosive owing to such local or transient overheat. The waste fluid which has been heated by the preliminary heater 22 is maintained at a constant suitable temperature by reaction heat between the masses and metallic iron. Requirements for the raw material for the container 1 itself are that it have a chemical durability against the strongly acidic waste fluid, that it be structurally tough and preferably lightweight, and therefore as such a raw material, fiber-reinforced plastics can be used. Examples of the fiber-reinforced plastics include polymers and copolymers of vinyl esters such as vinyl acetates reinforced with glass fiber.

Figure 5:
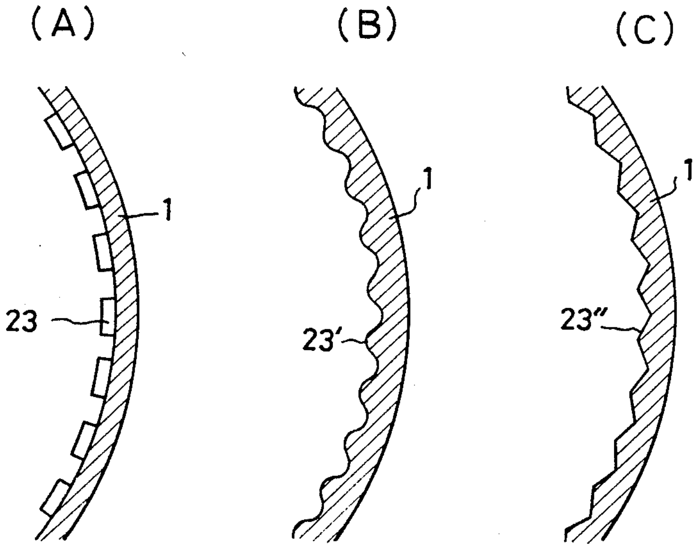
FIGS. 5(*a*), 5(*b*) and 5(*c*) are schematic sectional views showing different types of wall of a container in the stirring apparatus according to the present invention.

In addition, the stirring apparatus of the present invention rotates the container 1 into which the mixture of the waste fluid and metallic iron has been introduced, to thereby stir them, and therefore if the container 1 is constructed so that its inside wall surface may take a rough form 23, 23' or 23'' as shown in FIGS. 5(*a*) to 5(*c*), the effect of the stirring by the container can be improved.

Operating examples of the stirring apparatus according to the present invention will now be described.

OPERATING EXAMPLE 1

To 250 l of a ferric chloride waste fluid (containing heavy metals such as Fe, Ni, Cr, Cu and the like) which has already been used to etch metallic plates was added 230 kg of round nails each having a length of 5 cm as metallic iron. Afterward, the resulting mixture was heated up to a temperature of 80° to 90° C. and was then treated by the use of the stirring apparatus of the present invention. Table 1 sets forth concentrations of the respective heavy metals in the untreated waste fluid and in its filtrates after 1, 3, 5 and 7 hours' treatment. In Table 1, the unit of iron (Fe) is percent by weight and that of the other metals is ppm.

TABLE 1

| | Concentrations of Heavy Metals | | | | | | | | |
|---|---|---|---|---|---|---|---|---|---|
| | Fe | Ni | Cr | Cu | Pb | Mn | Zn | Cd | Co |
| Untreated Solution | 13.9 | 17280 | 2000 | 350 | 3 | 800 | 104 | ND* | 176 |
| After 1 h. Reaction | 20.8 | 800 | 24 | 1.1 | ND | 1000 | 90 | " | 109 |
| After 3 h. Reaction | 19.1 | 400 | 25 | 1.0 | ND | 1140 | 96 | " | 94 |
| After 5 h. Reaction | 21.1 | 368 | 1.8 | 1.0 | ND | 1220 | 108 | " | 94 |
| After 7 h. Reaction | 188 | 326 | 2.0 | 1.0 | ND | 1300 | 122 | " | 88 |
| (Removal Ratio) | — | 98 | 99 | 99 | 99 | — | — | — | 50 |

*The above-mentioned ND means "not detected".

The results in Table 1 indicate that almost all the metals were precipitated and removed in a treatment time of about 1 to about 3 hours and that the removal ratios of the metals of Ni, Cr and Cu were as high as 98% or more. The table does not set forth the removal ratios of Mn (manganese) and Zn (zinc), but it was confirmed that these metals did not affect the reproduction of ferric chloride, since contents of these metals were low. The iron which remains in the filtrate will become the main component of the reproduced ferric chloride solution. The ferric chloride solution can be reproduced by blowing a chlorine gas into the treated solution, and if necessary, adjusting concentrations of the respective components.

OPERATING EXAMPLE 2

This embodiment is connected with a two-stage treatment. That is, a first treatment is carried out in the stirring apparatus, and metallic iron masses are then added to the resulting filtrate, followed by a second treatment.

At the time of the treatment, a reaction temperature was set to a level of 90° to 100° C., and the first treatment was performed for 60 minutes. Afterward, a filtrate obtained by solid-liquid separation was subjected to the next second treatment.

This second treatment was carried out as follows: The filtrate obtained by the solid-liquid separation was heated up to the same temperature level as in the first treatment, was then placed in the stirring apparatus, and was stirred and mixed with metallic iron masses in order to perform a reaction for removing the heavy metals. After the reaction, the waste fluid was filtered, thereby achieving the solid-liquid separation, and into the resulting filtrate, a chlorine gas ($Cl_2$) was then blown. In this way, the iron solution was reproduced. It is also noted that a reaction time of the second treatment was set to, for example, 30 minutes.

The results are set forth with concentrations of the heavy metals in Table 2.

TABLE 2

| | Concentrations of Heavy Metals | | | | | | | |
|---|---|---|---|---|---|---|---|---|
| | Heavy Metal | | | | | | | |
| | Fe | Ni | Cr | Cu | Mn | Zn | Pb | Co |
| Untreated Solution | 19 | 18500 | 1570 | 865 | 978 | 56 | 5 | — |
| After First Treat. | 18 | 5010 | 450 | 25 | 880 | 30 | 4 | — |
| After Second Treat. | 17 | 50 | 15 | 10 | 820 | 28 | 2 | — |

The unit of Fe is percent by weight and that of the other metals is ppm.
The reaction time of the first treatment was 60 minutes and that of the second treatment was 30 minutes.

It can be appreciated from the results in Table 2 that when the two-stage treatment is carried out by the use of the stirring apparatus of the present invention, the reproduced solution can be obtained in which the concentrations of main heavy metals such as Ni, Cr and Cu are as low as those of the metals in the fresh ferric chloride solution.

OPERATING EXAMPLE 3

A ferric chloride waste fluid (containing Fe, Ni, Cr and other heavy metals), which had been used to etch metallic plates, was heated up to 90° C. by means of a preliminary heater. This heated ferric chloride waste fluid was immediately poured into a stirring apparatus of the present invention in which metallic iron had already been placed, and a treatment was then carried out. Table 3 sets forth concentrations of the respective heavy metals in the untreated waste fluid and in its filtrates after certain hours' treatment. In Table 3, the unit of iron is percent by weight and that of the other metals is ppm.

TABLE 3

| | Fe | Ni | Cr | Cu |
|---|---|---|---|---|
| Untreated Solution | 18 | 15500 | 830 | 5100 |
| After 10 min | 19 | 2300 | 7 | 2 |
| After 50 min | 20 | 300 | 3 | 2 |
| After 90 min | 20 | 91 | 2 | 2 |
| After 120 min | 20 | 68 | 1 | 1 |
| Removal Ratio (%) | — | 99.6 | 99.9 | 99.9 |

According to the stirring apparatus of the present invention, the following functional effects can be obtained.

(1) Since the container in which the mixture of the waste fluid and the metallic iron masses is placed is rotated in order to stir the mixture, the mutual contact and probability of collision of the metallic iron masses is increased. In consequence, nickel which is liable to precipitate on the surfaces of the metallic iron masses in order to make the latter a passive state can be peeled off effectively. Hence, according to the stirring apparatus of the present invention, the time required for the reaction can be curtailed remarkably.

(2) The stirring apparatus of the rotational system which the present invention takes can be designed in a compact structure, and therefore this apparatus only occupies a small area.

(3) The gas, bubbles and mist generated during the reaction can be discharged without any difficulty.

(4) The inside wall surface of the container may be finished into a rough form, whereby the stirring effect can be improved even more.

(5) The stopper may be attached to the rotating mechanism, whereby the container can be stopped at an optional position. Therefore, the waste fluid and the metallic iron masses can be conveniently poured into the container and the treated solution removed from the container.

(6) Instead of installing a heater for accelerating the reaction in the container, the preliminary heater may be disposed on the upstream side of the container. In such an arrangement, any local or transient overheating does not occur in the container, and therefore the reaction is easy to control and the container can be maintained conveniently.

What is claimed is:

1. Apparatus for separating heavy metals from a ferric chloride waste fluid containing said heavy metals and metallic iron masses, wherein said heavy metals include iron and a substantial portion of nickel, said nickel having a tendency to adhere to the surface of said metallic iron masses, said apparatus comprising a sealable container having a predetermined axis of rotation, said sealable container including a sealable entrance port for said ferric chloride waste fluid and said metallic iron masses and at least one exit port for withdrawing said separated heavy metals and treated ferric chloride waste fluid therefrom, feed pipe means for supplying said ferric chloride waste fluid to said entrance port of said sealable container, preliminary heating means for heating said ferric chloride waste fluid in said feed pipe means prior to supplying said ferric chloride waste fluid to said entrance port of said sealable container, rotating means for rotating said sealable container about said predetermined axis of rotation with sufficient intensity to substantially prevent said nickel from adhering to the surface of said metallic iron masses, and stopping means for stopping said rotating of said sealable container at a predetermined rotational angle.

2. The apparatus of claim 1 including excess fluid passage means for the discharge of excess fluid generated within said container during said rotating of said container.

3. The apparatus of claim 2 wherein said rotating means includes rotary shaft means corresponding with said predetermined axis of rotation of said sealable container, said sealable container being rotatable about said rotary shaft means, and wherein said excess fluid passage means comprises conduit means within said rotary shaft means.

4. The apparatus of claim 3 wherein said excess fluid passage means further includes liquid gas separation means for separating liquid from gas in said fluid passing through said conduit means.

5. The apparatus of claim 1 wherein said sealable container includes an inner wall surface, said inner wall surface including a roughened configuration so as to provide increased agitation within said sealable container during said rotating of said container.

6. The apparatus of claim 1 wherein said sealable container includes a sidewall substantially perpendicular to said predetermined axis of rotation of said sealable container, and wherein said stopping means comprises a plurality of apertures in said sidewall of said sealable container, said plurality of apertures being located at predetermined angular positions, and further including brace means mounted adjacent to said sidewall of said sealable container, said brace means including a brace aperture, whereby said brace aperture may be aligned with one of said plurality of apertures in said sidewall of said sealable container.

7. The apparatus of claim 6 including fixing rod means for insertion through said brace aperture and said one of said plurality of apertures in said sidewall of said sealable container so as to stop said rotating of said sealable container at said predetermined rotational angle.

8. The apparatus of claim 1 wherein said sealable container includes an inner wall surface, said inner wall surface comprising a fiber-reinforced plastic.

9. The apparatus of claim 8 wherein said fiber-reinforced plastic is selected from the group consisting of fiber-reinforced polymers and copolymers of vinyl esters.

10. The apparatus of claim 9 wherein said vinyl esters comprise vinyl acetate, and wherein said fibers comprise glass fibers.

11. A method for separating heavy metals from a ferric chloride waste fluid containing heavy metals, wherein said heavy metals include iron and a substantial portion of nickel, said method comprising heating said ferric chloride waste fluid, supplying said heated ferric chloride waste fluid to a sealable container having a predetermined axis of rotation, adding metallic iron masses to said sealable container, sealing said sealable container, rotating said sealable container about said predetermined axis of rotation with sufficient intensity to substantially prevent said nickel from adhering to the surface of said metallic iron masses, and stopping said sealable container at predetermined rotational angles.

12. The method of claim 11 including discharging excess fluid generated within said sealable container during said rotating of said sealable container.

13. The method of claim 12 including rotating said sealable container about a rotary shaft means corresponding to said predetermined axis of rotation, and including discharging said excess fluid from said sealable container through said rotary shaft means.

14. The method of claim 13 including separating gas and liquid from said excess fluid after discharging said excess fluid through said rotary shaft means.

* * * * *

UNITED STATES PATENT AND TRADEMARK OFFICE

CERTIFICATE OF CORRECTION

PATENT NO. : 4,940,337

DATED : July 10, 1990

INVENTOR(S) : Nobuo Nakaji and Hideki Kojima

It is certified that error appears in the above-identified patent and that said Letters Patent is hereby corrected as shown below:

Column 1, line 37, ""enviornmental" should read --environmental--.
Column 1, line 38, "pollution"" should read --pollution--.
Column 1, line 48, following "in" delete "a".
Column 1, line 49, delete "difference of".
Column 2, line 60, "there from" should read --therefrom--.
Column 3, line 41, delete "electronic" and substitute therefor --electric--.
Column 4, line 21, "enlongated" should read --elongated--.
Column 4, line 22, "enlongated" should read --elongated--.

Signed and Sealed this

Twenty-fourth Day of September, 1991

*Attest:*

HARRY F. MANBECK, JR.

*Attesting Officer* *Commissioner of Patents and Trademarks*